Aug. 14, 1945.  E. F. MORONEY  2,382,499
SHIP STRUCTURE
Filed Feb. 17, 1942  6 Sheets-Sheet 5
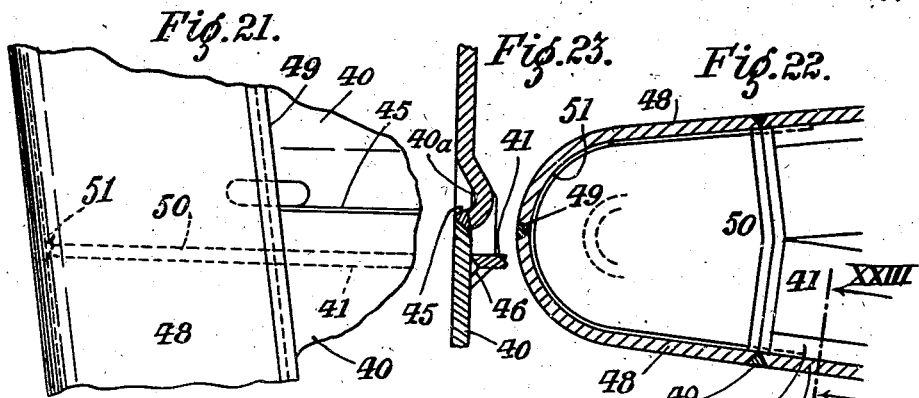
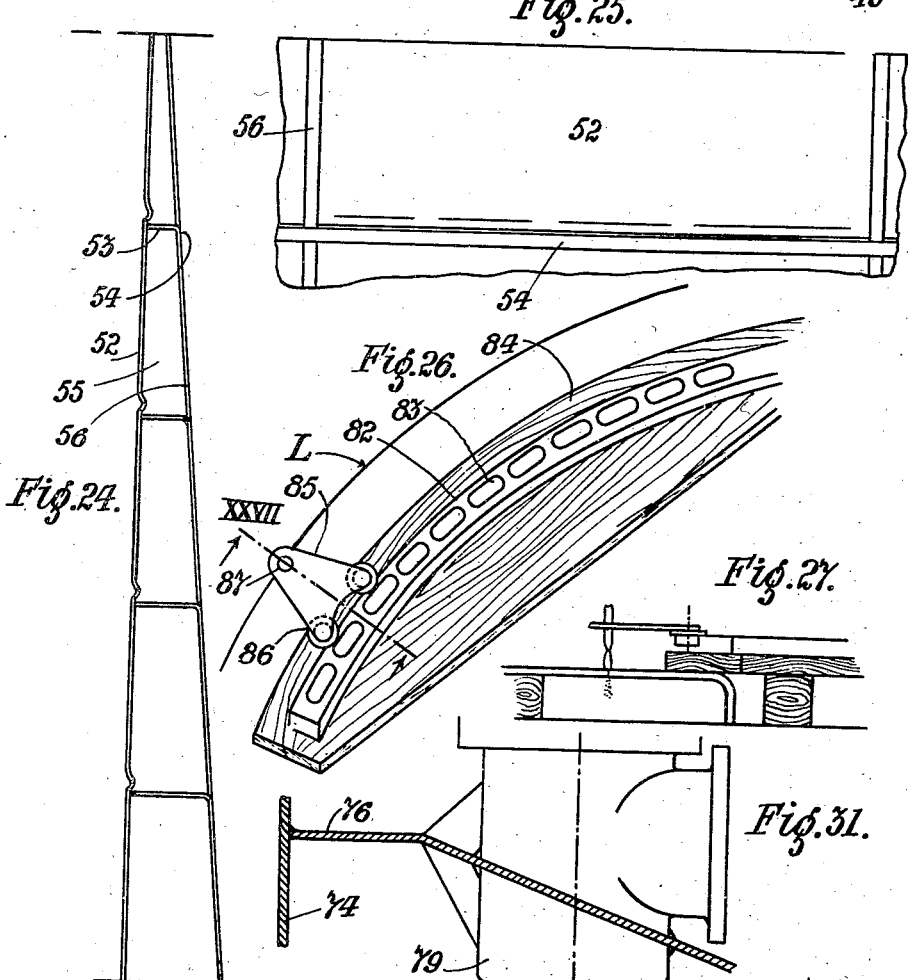
INVENTOR:
Edward Fitzgerald Moroney
By (signature)
his ATTY.

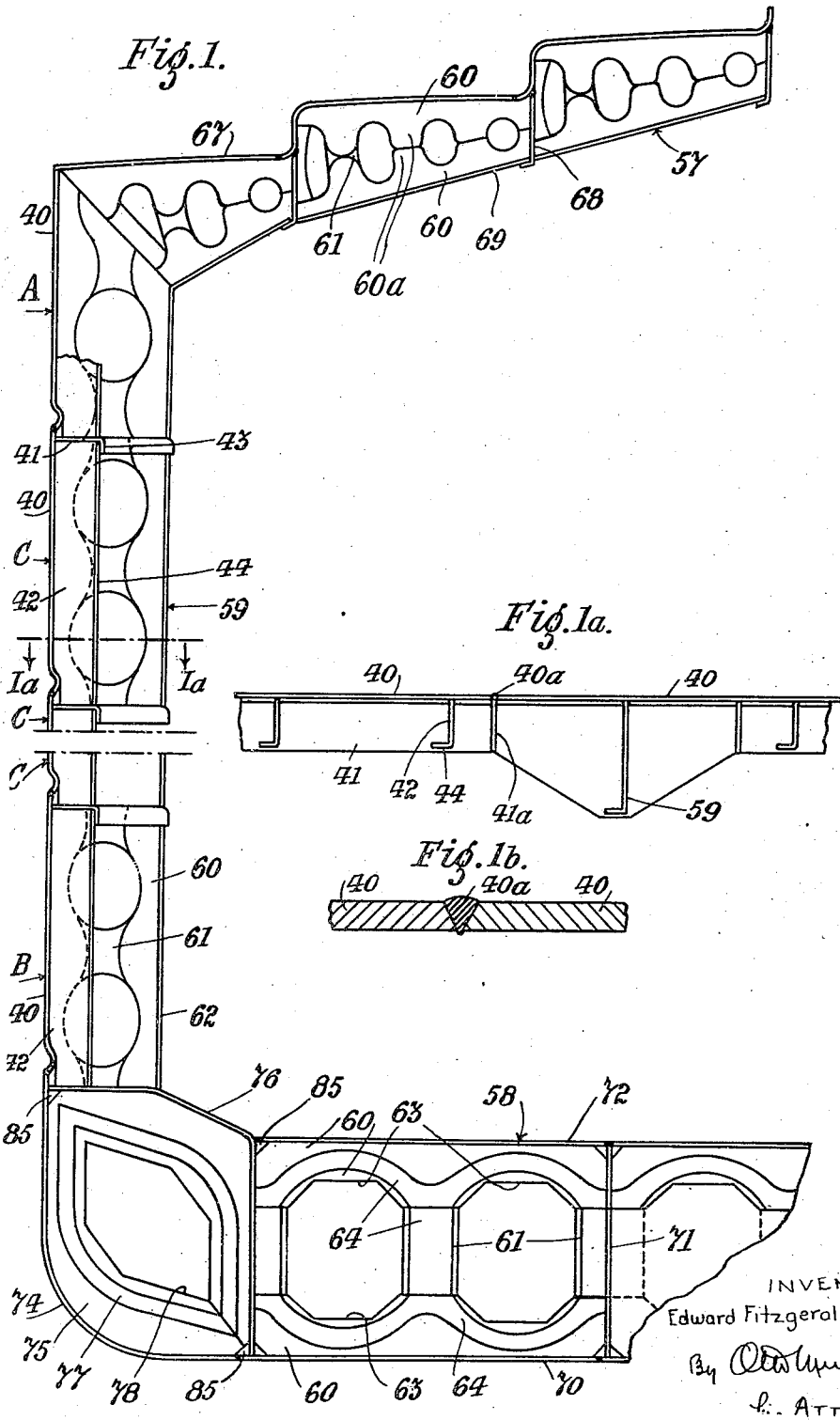

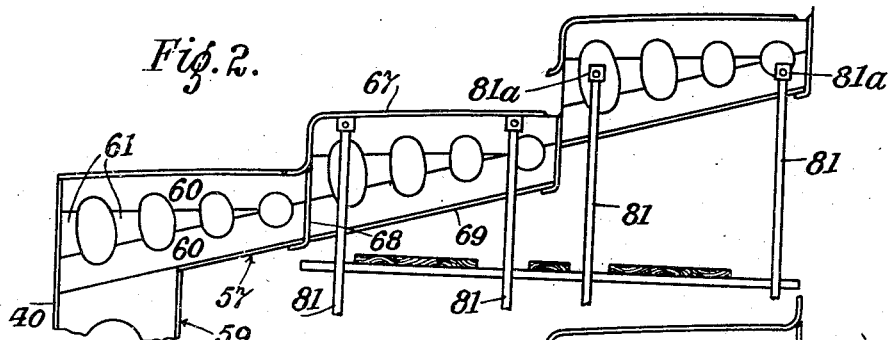
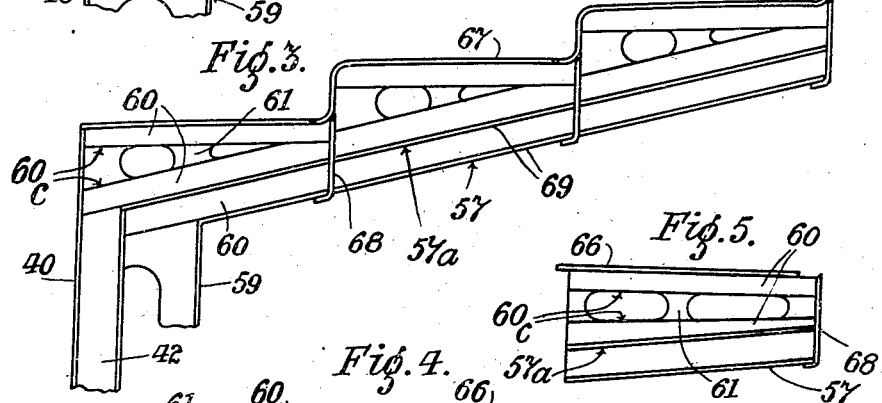
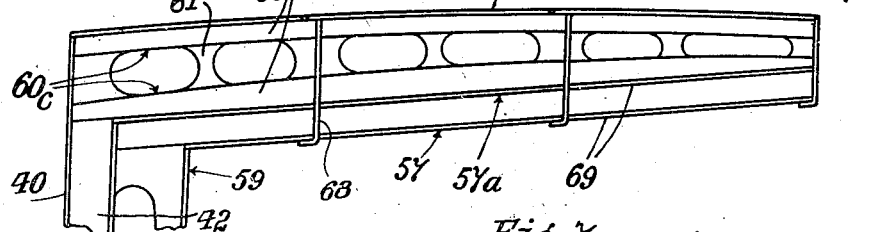
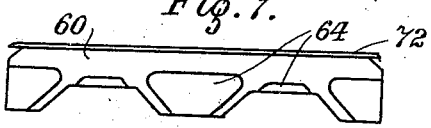
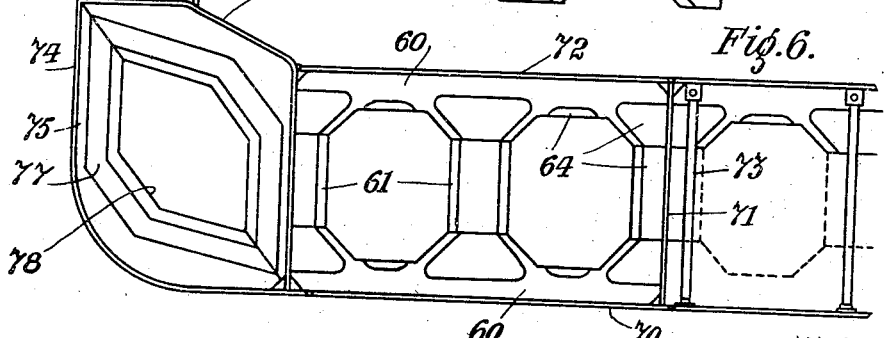

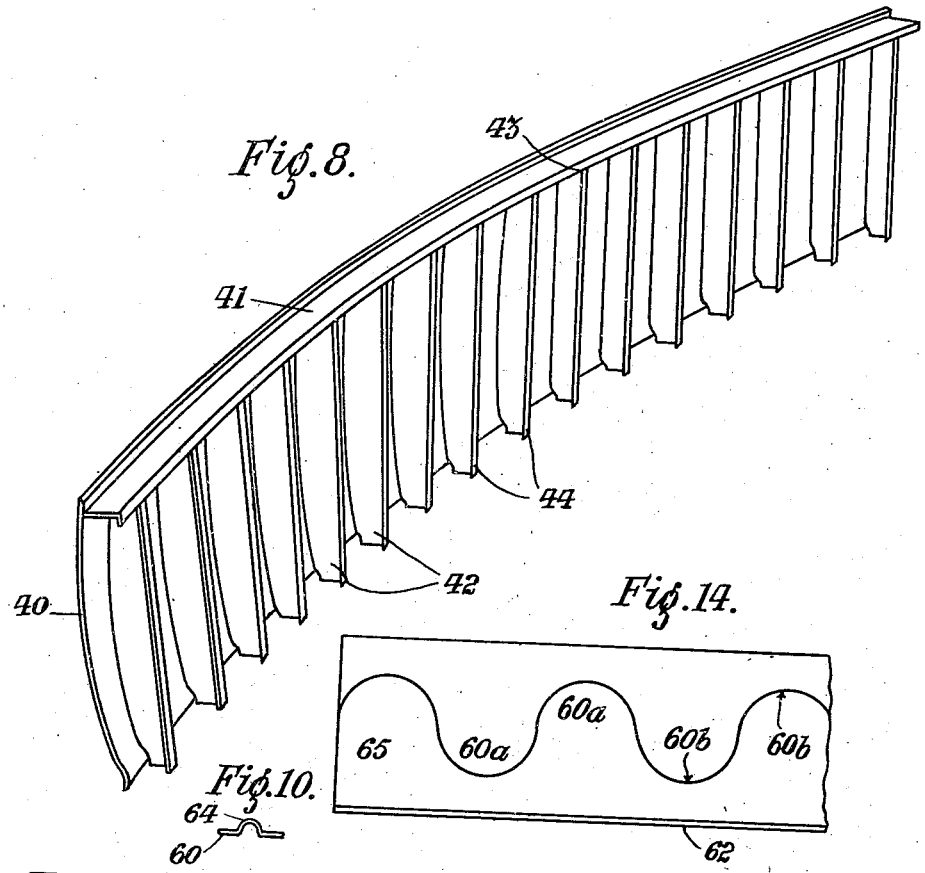

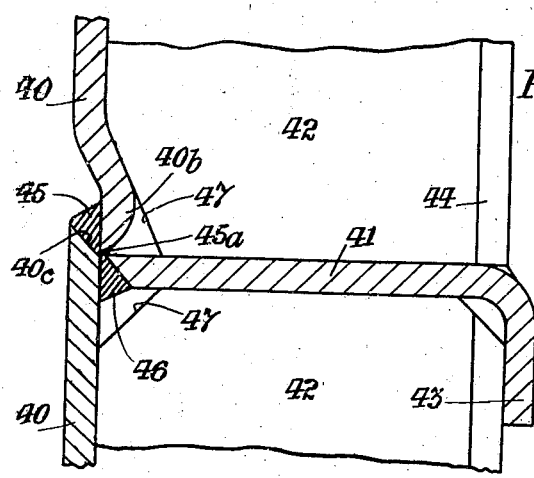
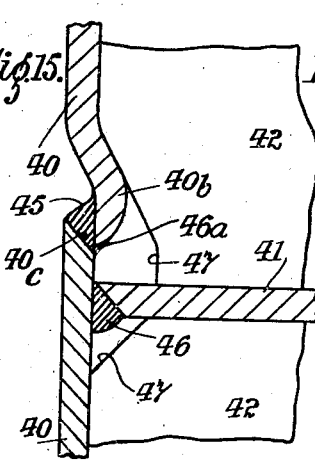
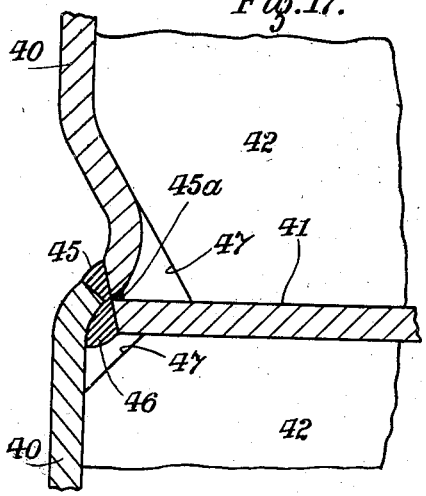
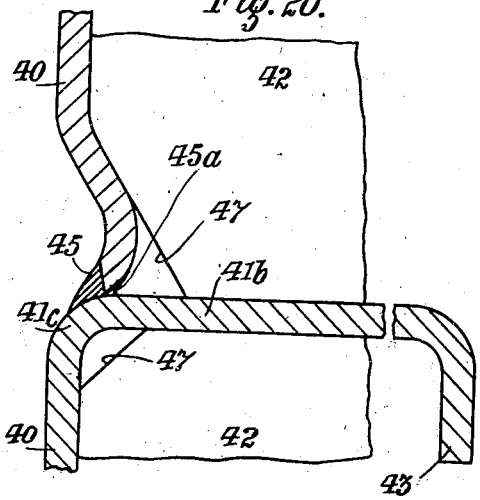
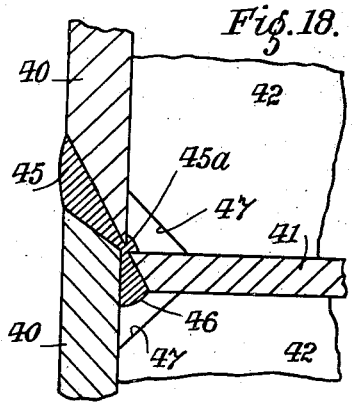
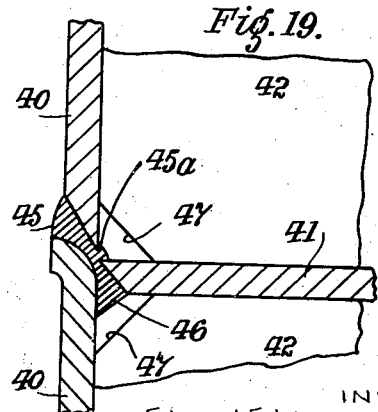

Aug. 14, 1945.    E. F. MORONEY    2,382,499
SHIP STRUCTURE
Filed Feb. 17, 1942    6 Sheets-Sheet 6

INVENTOR
Edward Fitzgerald Moroney
By
ATTY.

Patented Aug. 14, 1945

2,382,499

UNITED STATES PATENT OFFICE 2,382,499

SHIP STRUCTURE

Edward Fitzgerald Moroney, Penarth, Glamorgan, South Wales

Application February 17, 1942, Serial No. 431,225
In Great Britain January 28, 1941

4 Claims. (Cl. 114—79)

This invention relates to improved design and methods of construction of vessels of various descriptions—for example warships, merchant ships, yachts and floating docks—storage tanks and other structures, whereby great advantage is obtained by down hand welding in electric and other welding processes, including automatic machine welding.

An object of the invention is to obtain lightness with stiffness in the structure and economy by making use of plate material without extraneous stiffening.

Another object of the invention is to make provision whereby most parts of the structure can be fabricated or built independently of each other and whereby for final assembly only a minimum amount of welding is required on the site to complete the structure. By virtue of such provision, in the case of ships the launching ways are not long occupied for any single ship, thereby affording facilities for rapid and economical construction. Moreover, a considerable amount of construction can be done under cover.

Another object of the invention is to make provision whereby various parts can be welded together on a construction table, or jig, which can be set to any angle so that down hand welding can be effected, either by hand or machine process. Upon this table the various pieces can be accurately spaced and secured for welding. Brackets, frames, floors, and girders may be made from narrow thin plates, which are cut into geometrical shapes as required, and parted by gas flame or oxy-acetylene burner. Such plates may be formed in a machine with bossings or indentations which give great stiffness to them. Such plates placed at any required distance apart may be joined by embossed or otherwise stiffened joining pieces which are welded in place, thus forming webs. These plates and joining pieces may be formed to provide lightening holes in the region of the neutral axis of the webs, where material can best be spared.

Another object of the invention is to eliminate the use of rolled sectional material—that is, material of angle-section, bulb-section, I-section, T-section, channel-section and so on—and nevertheless obtain the necessary stiffness and strength in the material itself by bossing and flanging where required.

Accordingly, the invention resides in a ship or other structure composed of plate units arranged in superposed strakes, each unit comprising a main plate and stiffening members formed of narrow mutually transverse plates in planes perpendicular to the plane of the main plate, said units being welded together along the abutting edges of adjoining main plates and along butt ends of said stiffening members.

The invention also resides in a ship or other structure composed of plate units arranged in superposed strakes, each unit comprising a main plate, a stringer formed of a narrow flanged plate welded edgewise to the main plate and extending alongside one longitudinal edge thereof and a series of frames formed as narrow flanged plates welded edgewise to the main plate and extending transversely from said stringer to the opposite longitudinal edge of the main plate, said units being welded together along the abutting edges of adjoining main plates and along the butt ends of aligned stringers and along butt ends of the frames.

In an alternative construction, the narrow flanged plate forming the stringer is an integral part of the main plate and is not welded thereto but is formed by flanging the main plate along a longitudinal edge thereof.

The invention will now be described by way of example as applied to the construction of a ship with reference to the accompanying drawings, in which—

Fig. 1 is a mid-section of one side of the hull of a ship constructed according to the invention.

Fig. 1a is a section on the line Ia of Fig. 1 and Fig. 1b is a fragmentary view to a larger scale of the vertical weld between adjacent main plates of the same strake.

Figs. 2, 3 and 4 are fragmentary midship-sections respectively showing modified deck structures.

Fig. 5 shows a beam unit which is a component of the deck structure according to Fig. 4.

Fig. 6 is a fragmentary midship-section showing a modified bottom structure; and Fig. 7 shows a girder component of the bottom structure according to Fig. 6.

Fig. 8 shows a plate unit which is a component of the ship side structure.

Fig. 9 shows a beam unit, being a modification of that shown by Fig. 5; and Fig. 10 is a section on line X of Fig. 9.

Fig. 11 is a fragmentary elevation of a girder unit somewhat similar to a unit in the bottom structure according to Fig. 6; and Fig. 12 is a section on line XII of Fig. 11.

Figs. 13 and 14 illustrate alternatives of a preliminary stage in the formation of deep-web girder beam and frame units.

Figs. 15 to 20 are sections to a large scale showing various modifications of the interstrake joints shown in Fig. 1.

Fig. 21 is a fragmentary elevation and Fig. 22 a plan of the ship's stem; and Fig. 23 is a section on line XXIII of Fig. 22.

Fig. 24 is a section and Fig. 25 a fragmentary elevation of a bulkhead.

Fig. 26 is a plan of apparatus for cutting plating to any required form, and Fig. 27 is a section on line XXVII of Fig. 26.

Fig. 31 shows a valve chest welded to a bilge-tank top plate.

In the several figures, similar and corresponding parts are denoted by the same reference characters.

Figure 28:
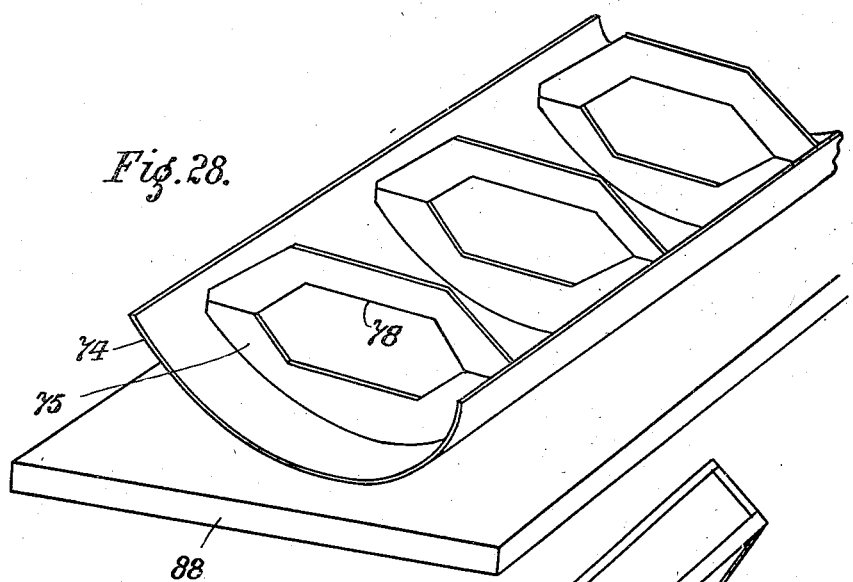
Fig. 28 illustrates the formation of a bilge strake unit.

Referring firstly to Fig. 1, the ship's side is composed of plate units all similar to one another and arranged in superposed strakes each consisting of said plate units welded end-to-end, the units belonging to each intermediate strake being welded to the units above and below them belonging to the adjacent upper and lower strakes. Each of these various units consists of a main plate 40, which is of uniform thickness and is a side plate of the ship's hull; a stringer 41, and a series of frames 42. One of these units is shown in Fig. 8. As shown, the main plate 40 is curved in accordance with its position in the hull. The stringer 41 is a narrow plate formed with an integral downturned flange 43 and curved to fit against the main plate, to which it is welded edgewise along a line close to the plate's upper longitudinal edge. The stringer 41 ends at the ends of the main plate. The frames 42 each consist also of a narrow plate with an integral flange 44 and each of them is welded edgewise to the main plate so as to extend transversely from the stringer to the lower edge of the main plate. The frames 42 each end at or slightly below said lower edge (see also Figs. 15 to 20). The welded edge of each of the frames 42 is cut to the curvature of the respective main plate. Thus it will be clear that the stiffening members constituted by the stringer 41 and frames 42 all end at or about the limits of the main plate 40.

All the plate units which form the sides of the hull, and of which the unit according to Fig. 8 is a typical example, are separately preconstructed all in readiness for butt-welding to one another at the place where the ship is being built. In Fig. 1, the uppermost strake of these units is denoted A, the lowermost strake is denoted B; and the intermediate strakes are denoted C. The plate units of the strakes C are each welded along the upper and lower longitudinal edges of their main plates to the adjoining upper and lower main plates; and the lower ends of the frames of strakes A and C abut against and are welded to the stringer 41 of the next lower strake. The abutting vertical edges of adjacent main plates in each strake are welded to one another at 40a (Figs. 1a and 1b) and the abutting ends of aligned stringers 41 are welded to one another at 41a. All of these welding operations may be performed by down-hand welding operations.

Figs. 15 to 20 show different ways for forming the main plates 40 at their abutting upper and lower edges and of forming said edges and the edges of the stringers 41 in order that suitable spaces for the reception of welding material are provided. From the foregoing description it will be understood that the welding 45 between the main plates is applied in the building of the ship, whereas the welding 46 between the stringers and the main plates is applied during the preconstructed elsewhere of the plate units. It will be noted that in each modification, the space which receives the welding 45 opens upwards, so that down-hand welding is the method employed. Likewise, an upwardly opening space for an auxiliary run of back welding 45a between the stringer 41 and the next upper main plate 40 is also provided, except in Fig. 16 arrangement.

In Figs. 15 and 16, the upper plate is bent or joggled inwards at 40b and the upper edge is bevelled at 40c. The Fig. 16 modification differs from the others in that the frames 42 do not stop at the level of the main plate's lower edge but extend lower beyond said edge. Provision is thus made for an independent auxiliary run of welding 46a between the main plates 40 at the back thereof. In Fig. 17, both plates are joggled and both edges are bevelled. In Fig. 18, the desired space is got simply by appropriate bevelling of the adjoining edges, this modification being especially suitable for thick plates. In Fig. 19, the lower plate is joggled outwards at its upper edge and the lower edge of the upper plate is simply bevelled. The modification according to Fig. 20 differs from all the others in that the narrow flanged plate 41b is not welded to the main plate but is an integral part thereof formed by bending or flanging the upper portion thereof inwards at 41c to give the web portion 41b and downwards at the margin to give the flange 43 as in the other modifications. The lower edge of the upper plate 40 is joggled somewhat similarly to the modification according to Fig. 17, but said edge is welded at 45 to the bend 41c. An embodiment such as shown by Fig. 20 is suitable mainly for thin plates. To facilitate the welding operations both in the construction of the plate units and in the building of the ship, the inner top and bottom corners of the frames 42 are cut away at 47.

In each embodiment, the frames 42 of the upper unit rest upon the stringer 41 of the lower unit, and in this way the adjacent longitudinal edges or surfaces of the upper and lower plates 40 are maintained in the proper relationship for welding. Moreover, said edges or surfaces are complemental in the sense that they cooperate to provide the requisite upwardly opening space for downhand welding. Moreover, as the run of back welding 45a or 46a extends above the stringer 41 of the lower unit, said stringer leaves the way clear for downhand welding.

The plates of upper and lower units are coplanar, each being flat except where it may curve to suit the contour of the ship's hull; and so the upwardly opening space between the adjoining longitudinal edges extends horizontally in a long substantially straight run.

At the stem and stern of the ship, welded plate units may be provided instead of the usual forged stem and stern posts. As shown in Figs. 21 to 23, which shows a portion of the stem of the ship, the main plates of the foremost plate units (Fig. 8) converge towards the stem. The latter comprises vertically extending stem plates 48 which are curved in horizontal section (Fig. 22) so that they abut against one another in the central longitudinal plane of the ship and against the foremost main plates 40. The abutting edges are bevelled to provide spaces for the welding 49. The stem plates 48 are strengthened by webs or diaphragm plates 50 at the level of the stringers 41. These webs 50 are horizontal plates which are welded at 51 along their peripheries to the stem plates and which also are welded to the stringers. These stringers and webs impart such strength to the hull of the ship that the welded plate structure described serves adequately the function of the usual stem post, being adapted to resist shock due to striking floating objects.

The stern post may be similarly constructed, but would be fitted with a forged or cast steel tube, having its axis longitudinally arranged, such tube being welded in position and being machined to receive the usual propeller shaft.

The ship's various bulkheads are constructed in substantially the same way as the ship's sides. As shown in Figs. 24 and 25, a bulkhead is composed of preconstructed plate units arranged in superposed strakes. Each unit comprises a main plate 52; a stringer 53 formed of a narrow plate which has a strengthening flange 54 and is welded edgewise to the main plate, alongside the upper edge whereof the stringer extends; and vertical frames 55 formed as narrow plates which have strengthening flanges 56 and are welded edgewise to the main plate, the frames extending from the stringer to the lower edge of the main plate. The units are welded together in the same way as described with reference to the building of the ship's sides. There may be as few as two vertical frames per unit, but this number may be varied according to the strength which the bulkhead must possess. Preferably, the webs 55 of the frames increase in width progressively from the top of the bulkhead to the bottom to give the most advantageous strength-weight relationship.

Structural members such as beams, girders and frames, incorporated in the ship's structure may be preconstructed as deep-web units adapted for welding as such into position in the building of the ship. For example, as shown in Fig. 1, deep-web beam units 57 are used to support the deck; deep-web girder units 58 are incorporated in the double-bottom tank structure and deep-web frame units 59 are used at intervals in cooperation with the frames 42 to impart transverse strength to the ship structure. These units may all be made by substantially the same method, as will now be described.

Fig. 9 shows an example of a deep-web beam unit. The deep web consists of two co-planar plates 60 which are interconnected at intervals by intermediate-plates 61 and the lower portion of which is strengthened by a bottom flange 62. The intermediate-plates 61 are butt welded top-and-bottom to projecting or salient edges of the web plates 60, the plates 61 being formed to abut exactly against these edges. Between the intermediate-plates, large recesses 63 are formed in the web-plates in order to leave open spaces and thus render the unit as light as practicable along its neutral axis without detracting materially from its strength. To increase the stiffness without adding to the weight, the web-plates 60 and the intermediate-plates 61 are impressed with indentations or corrugations 64 (Fig. 10) which are formed (Fig. 9) to suit the shape of the plates 60, 61. Thus, it will be seen, the unit is designed to have maximum strength with minimum weight. The aforesaid indentations 64 have the beneficial effect that they reduce or prevent vibration and exfoliation of scale and rust, which is a cause of rapid wastage in flat plates.

Figs. 11 and 12 show an example of a deep-web girder unit. Parts of and formations in said unit corresponding to those of the unit according to Figs. 9 and 10 are denoted by the same reference numerals. The two examples differ not only in the geometrical form of the projections and recesses but also in that the opposed web-plates 60 in Fig. 11 are parallel whereas in Fig. 9 they are mutually inclined to form a unit of progressively increasing depth.

The deep web plates may be cut from a single strip of plate in the manner illustrated by Figs. 13 and 14. As shown in Fig. 13, a flat strip of plating 60 is cut along a line 65 for example by means of a gas-burning cutter. The half-plates thus produced each have a cut edge outlining trapezoidal projections marked 60a in Fig. 13; and between each two projections of a half-plate there is a recess whose edge is marked 60b in Fig. 13. In cutting the half-plates to lengthwise size and assembling them as a welded unit according to Fig. 11, the procedure is such that the projections of each half-plate come exactly opposite to those of the other half-plate so that the intermediate-plates 61 will fit between opposed projections.

Fig. 14 corresponds to Fig. 13 except that the projections and recesses are cut semi-circularly after which the semi-circular portion of each projection is cut-off diametrally to leave a straight edge for butt-welding to the intermediate-plates 61, as shown by Fig. 9.

Referring again to Fig. 1 and also to Figs. 2 to 7 it will be seen that various examples of deep-web units similar or substantially similar to those described with reference to Figs. 9 to 14 are shown embodied in the deck side and tank-bottom structures of a ship's hull.

Fig. 2 shows a deck structure 57 comprising a number of preconstructed deep-web units practically the same as shown in Fig. 9, the indentations 64 not being drawn in Fig. 2 for clearness of illustration. The mutually inclined relationship between the upper and lower web-plates 60 gives a particularly strong and useful construction for a structure of this nature, which functions essentially as a cantilever. To add to the strength of the hull, longitudinal stringers, in the form of flanged webs 68, are welded between the abutting ends of the deep-web units.

The deck structures 57a according to Figs. 3 to 5 differ from the deck structures 57 in that their upper and lower web-plates 60 are not formed with projections and recesses but have straight inner edges 60c to which the intermediate plates 61 are welded. This gives a narrower deck beam unit well adapted for incorporation in the ship structure in the same transverse planes as the narrower side frames 42. The deeper beams 57 would be used only co-planar with deep-web side units 59 hereinafter described. These deeper beams not only add generally to the strength of the hull but are particularly useful for strengthening the deck-structure beside hatch and other openings in the deck.

In the deck structure 57 according to Fig. 1, the deep-web units are formed in the manner according to Fig. 14, but the semi-circular projections 60a are not completely cut off, being cut along lines which leave straight edges adapted to abut against one another as regards several of the projections in any one unit, thus minimising the need for additional intermediate-plates 61.

Fig. 6 shows a tank-bottom structure comprising deep-web units practically the same as in Fig. 11, Fig. 7 showing the upper portion of the deep web as preconstructed prior to welding to the lower portion with the distance plates between them.

The tank-bottom structure 58 according to Fig. 1 differs from the foregoing in that the indentations 64 curve along the body of the web-plate 60 and surround each recess 63 thereof.

In the side structure according to Fig. 1, the deep-web units 59 have their web-plates 60 cut substantially as in Fig. 14, but the curves are "flatter" and the projections are left in their curved form, so that the intermediate-plates 61 must also be curved conversely to abut for welding between opposed projections. This procedure avoids wastage of material in making the web-plates from the original strip of plate. As aforesaid, these units 59 are in the same transverse planes as the deep-web deck beams 57.

Although the deep-web units are of general utility as deck-beams, for example in connection with the usual cambered deck 66 shown in Figs. 4 and 5 or with a flat deck (not shown), they permit the construction of a novel form of deck for cargo ships—namely, a stepped deck—such as illustrated by Figs. 1, 2 and 3. In these figures, the stepped deck is denoted by 67. For use in connection with such a deck, the deep-web units are especially suitable, as they may have upper and lower web-plates 60 which are mutually inclined with comparative steepness, thus giving a beneficial cantilever construction. In such a deck, the steps extend longitudinally of the ship and go up from the sides of the ship towards the central longitudinal portion thereof. In addition to the structural advantages of such an arrangement, it has certain advantages, namely: the steps resist shocks on deck cargo; they afford self-trimming for cargoes such as coal and grain; they give extra buoyancy; they afford ample working space, giving access fore-and-aft at levels higher and drier than flat or cambered decks which tend to hold quantities of sea water endangering the crew and the ship.

In a deck structure for flat or cambered decks (Figs. 4 and 5) the longitudinal inter-unit stringers 68 have deeper webs.

It will be seen that each preconstructed plate unit of the deck structure consists of a deck plate 67, a series of transverse deep-web beams 57a, one or more deeper beams 57, and a longitudinal stringer 68, all welded together in readiness for incorporation by welding in the structure of the ship. The lower web-plates 60, in both types of beam 57 and 57a, are flanged along their bottom portion, at 69. The top edges of the upper web-plates 60 are cut to the curvature of the decks, whether stepped or cambered.

The double-bottom tank structure also consists of units which are preconstructed in readiness for assembly in the ship structure. These units comprise two kinds, namely: (1) bottom plates 70 with longitudinal keel or keelson plates 71 welded thereto (Figs. 1 and 6); (2) top plates 72 with the upper portions 60 of transverse deep-web girders pre-welded thereto (Fig. 7).

The bilge-tanks (which may be used as wing ballast tanks) are composed of completely preconstructed plate units, as will be hereinafter described.

In the final assembly of the various plate units at the site where the ship is to be built, the bottom plates 70 with longitudinal keel and keelson plates 71 already welded to them are placed side-by-side and end-to-end throughout the extent of the ship's bottom and they are butt-welded together from above. Then the tank-top plates 72 with only the upper portions 60 of the deep-web girders welded to them are lowered upon jacks 73 and set precisely in place in relation to the plates 71. The lower portions 60 of the deep-web girders with the distance plates 61 welded to them (these parts have been previously put inside the double-bottom structure) are now set precisely in place and are spot-welded (or tack-welded) to the plates 70 and 71. The plates 72 and the attached upper portions 60 (Fig. 7) are temporarily removed to give freedom to complete the welding of the lower portions 60 to the plates 70 and 71. The temporarily removed parts are finally replaced and welded permanently. The welding throughout is done by down-hand operations.

It will be noted that need for cement is entirely eliminated with consequent saving in weight.

With reference now to the bilge tanks between the double-bottom tank structure and the sides (Figs. 1 and 6), these are preconstructed and incorporated in the ship's structure as follows. The bilge plates 74 are formed to the appropriate curvature in the usual way. Then bilge bracket plates or diaphragm plates 75 are welded to the plates 74 so as to be coplanar in the ship structure with the side frames 42, 59 and the double-bottom girders. Next the bilge-closing plates 76 are welded in place, thus completing the general structure of the bilge-tank units. The units thus preconstructed are taken to the shipbuilding site for incorporation by welding in the ship's structure. There they are welded to the double-bottom tanks and to one another end-to-end.

The plates 75 in general are made as open-centre frames (see Fig. 28), but where it is desired that any of them shall separate and seal one bilge tank from another the plate 75 is instead left solid; for example, in way of the engine room or other machinery spaces. Moreover, the bilge plates 74 of tanks with sealed ends may be formed with openings (having gratings) to the sea.

Plates 75 made as open-centre frames may be impressed with an indentation 77 around their open centres 78 (Figs. 1 and 6) in order to stiffen them and prevent deterioration due to exfoliation.

Corners of the double-bottom tank girder webs 60 and of the bilge diaphragm plates 75 may be cut away at 85 (except where said webs and plates seal one tank from its neighbour) to expose the adjacent longitudinal welded seams for examination and to permit the free passage of water and air from space to space of the tanks and bilges (see Figs. 1 and 6).

Valves or other fittings to be mounted on the bilge tanks can readily be welded in place during preconstruction. For example, Fig. 31 shows a valve with a steel chest or body 79 set through a hole in the closing plate 76 of a bilge tank and welded thereto. Such a valve will be practically shock proof.

With reference to the side structures, the preconstructed units (see Fig. 8) are built-up strake by strake and welded together end-to-end (Figs. 1a and 1b) and one on top of another (Figs. 15 to 20), as hereinbefore described. As shown by Figs. 1 and 6, the lowermost main plates 40 and frames 42, 59 are welded to the top edges of the bilge plates 74 and to the closing plates 76 in the same way as upper side-structure units (Fig. 3) are welded to lower side-structure units.

In the building of the sides, the stringers 41 (or 41b) are particularly useful as platforms whereon to rest the upper units during assembly and welding.

With reference to the deck structure, the preconstructed units (see for example Fig. 5) comprise a deck plate 66, a series of transverse deep-web beam units 57a, with or without one or more deeper units 57, and a stringer web 68, these elements being all welded together. The deck units thus preconstructed are welded in position by firstly welding the outermost of them to the corresponding side frames 42, with or without 59, and to the tops of the side plates 40, and then welding each of the inner deck units successively to the adjacent outer deck unit. This latter operation involves simply butt-welding the edges of the deck plates 67 to adjoining deck plates and welding the ends of the deep-web beams to the stringers 68.

In Fig. 2, tubular scaffolding members are shown at 81 as means for supporting the deck units while being welded in place. These members 81 have adjustable screwed ferrules 81a, the level of which can be precisely adjusted to ensure proper registration between the deck-plate edges to be welded together. The innermost deck unit is shown being lowered into place upon the ferrules 81a, while the intermediate unit is shown resting in position awaiting the outermost unit.

In the various preconstructed plate units hereinbefore described, certain of the plates must have an edge which is carefully shaped according to some predetermined curvature. For example, there are the edges of some of the side frame webs 42 (Fig. 8) and of some of the side frame deep webs 60 to be welded to curved main plating 40; there are the uppermost edges of the deep-web deck beams to be welded to cambered deck plates 67; there are also the lower edges of the deep-web deck beams in a simple cambered-deck arrangement such as illustrated by Fig. 4; and there are also the edges of the stringers 41 (Fig. 8). To effect accurate cutting of the various plates the apparatus and procedure now to be described with reference to the diagrammatic Figs. 26 and 27 may be adopted.

A line L similar to a given curve is drawn full size on a moulding loft or floor. An easily bent bar 82 of metal, for example lead or lead alloy, lightened by a series of holes 83, is bent to the precise curvature of the line. Bending is affected by placing the bar on a board 84 and using a carriage 85 to press the bar to the required curvature. The carriage 85 is roughly triangular, there being two rollers 86 at two of the angles and a tracer 87 at the third. The workmen move the carriage along the bar meantime pressing upon it sufficiently to keep the tracer accurately on the line to be copied. The board 84 with the bar 82 lying thereon set and inert is placed upon the plate to be cut and a burner is substituted for the tracer. The plate is thereafter cut to shape by moving the burner from end to end of the path set for the carriage along the bar, the active edge of which thus serves as a template.

The board 84 may form one of two boards hinged together like the covers of a book. When it is desired to cut a curve similar in shape but to the opposite hand, the coverlike boards are closed with the bar held between them and then they are turned upside-down. Thereafter, the now upper board is turned aside, leaving the bar exposed for further use as a template.

In the work of preconstructing the various plate units, a table 88 (Fig. 28) may be used to support the plate, whether curved or flat, to which web members (transverse and/or longitudinal) are to be welded. On the table, the parts may be set in their precise co-relationship and spot-welded to one another to fix them in a preliminary manner. In Fig. 28, a curved bilge plate 74 is shown on the table 88 and transverse diaphragm plates 75 are positioned on the plate 74.

Figure 29:
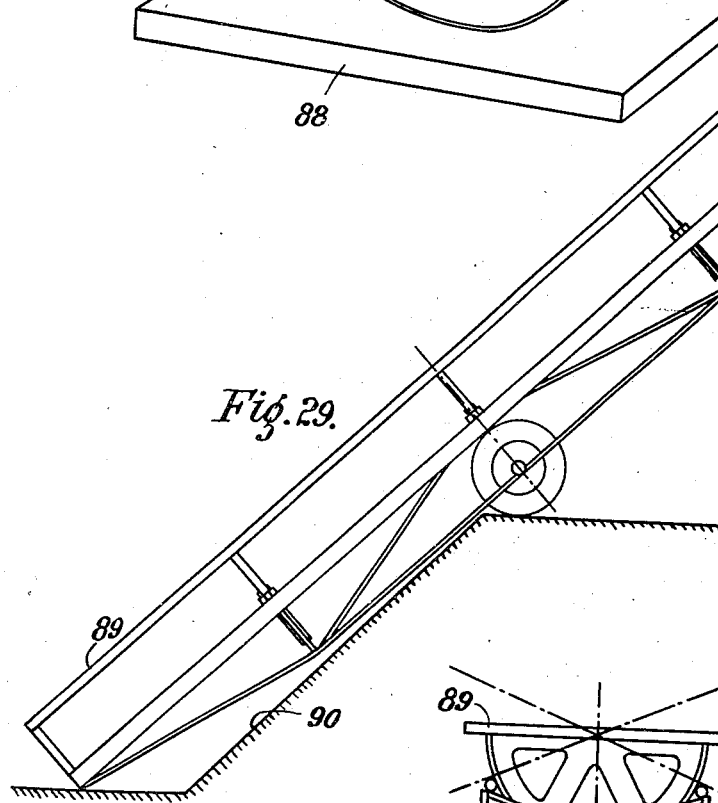
Figs. 29 and 30 are a side elevation and an end elevation, respectively, of apparatus for facilitating the welding of joints in the preconstruction of the plate units.
Figure 30:
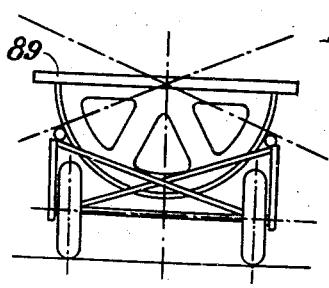

Thereafter, so that down hand welding may be employed throughout, a portable carrier 89, diagrammatically shown in Figs. 29 and 30 is utilised. The carrier 89 may be used beside a pit with a sloping wall 90 permitting the carrier to be tilted at a steep inclination. The carrier moreover is tiltable sidewise to a steep inclination in either direction. Thus, when the preliminarily fixed parts of a plate unit are positioned upon the carrier, this can be tilted in some direction or other to expose each seam upwards for down-hand welding.

By virtue of the fact that almost the entire hull of the ship is composed of plate units preconstructed as hereinbefore described, the length of time required to build a ship on a building slip is considerably reduced. Indeed, the usual shipyard slip is not essential, for the bottom portion of the ship could be built-up to the form of a shallow basin in a dry dock, then floated and removed to a wet dock or wharf under a simple jib crane or cranes of moderate size, and there the remainder of side units and the deck units could be added and welded in place. Launching would thus be rendered unnecessary.

Although the invention has been described with reference to the drawings as applied to ships the framing of which is a combination of transversely and longitudinally constructed frames, it is also applicable to ships of so-called "longitudinal" construction.

I claim:

1. A deck structure for use in ship construction composed of web-plate units welded together end-to-end to form deck beams, each of said units comprising web-plates and intermediate-plates which are welded to said web-plates to space them apart and which are themselves spaced longitudinally apart to leave open spaces along the central axis of the respective deck beam, and deck plates secured across the tops of series of said units arranged side-by-side, each inner series of said units being arranged at a higher level than the next outer series so that the deck plates form a deck structure of stepped formation with the steps running longitudinally and rising in the direction from the ship's sides inwards.

2. A deck structure for use in ship construction composed of side-by-side series of web-plate units welded together end-to-end to form deck beams, each of said units comprising inter-connected web-plates diverging outwards and the units of which each deck beam consists being so arranged that their lower web-plates constitute a substantially continuous member whereas their upper web-plates form steps that rise from a low level at the ship's sides to a high level at the ship's longitudinal central portion, and deck plates interconnecting the deck-beams and covering them, said deck plates being of stepped formation to suit the form of said upper web-plates.

3. In a ship structure the sides of which are built of side plate-units arranged in superposed strakes, each of such units comprising a main plate, a stringer formed of a narrow plate extending along the main plate at one longitudinal edge thereof and terminating substantially at the ends of said main plate and frames formed as narrow plates extending transversely from said stringer terminating substantially at the opposite longitudinal edge of said main plate, said units being welded together along abutting edges of adjoining main plates and at abutting ends of aligned stringers and at said ends of the frames, the combination of a structure constituting a ship's end and comprising vertically extending curved plates which are butt-welded to the main plates of the endmost of said side plate-units and which converge and abut at said end, and horizontal diaphragm plates which are peripherally welded to said vertically extending plates and the ends of the stringers of said endmost units.

4. In a ship structure the sides of which are built of side plate-units arranged in superposed strakes, each of such units comprising a main plate, a stringer formed of a narrow plate extending along the main plate at one longitudinal edge thereof and terminating substantially at the ends of said main plate and frames formed as narrow plates extending transversely from said stringer and terminating substantially at the opposite longitudinal edge of said main plate, said units being welded together along abutting edges of adjoining main plates and at abutting ends of aligned stringers and at said ends of the frames, the combination of a structure constituting the deck of the ship and comprising web-plate units welded together end-to-end to form deck-beams, each of said units comprising web-plates and intermediate plates welded to said web-plates to hold them apart, the outermost of said web-plate units in each of said deck-beams having its outer end welded to the top of a corresponding one of said frames, and deck-plates welded to the tops of said deck-beams and to the main plates of said side-plate units.

EDWARD FITZGERALD MORONEY.